(12) United States Patent
Sakurai (10) Patent No.: US 9,223,419 B2
(45) Date of Patent: Dec. 29, 2015

(54) CURSOR DISPLAY DEVICE AND CURSOR DISPLAY METHOD

(75) Inventor: Shinji Sakurai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 13/438,290

(22) Filed: Apr. 3, 2012

(65) Prior Publication Data

US 2012/0256831 A1 Oct. 11, 2012

(30) Foreign Application Priority Data

Apr. 7, 2011 (JP) ................. 2011-085556

(51) Int. Cl.
G06F 3/033 (2013.01)
G06F 3/0354 (2013.01)
G06F 3/03 (2006.01)
G06F 3/038 (2013.01)

(52) U.S. Cl.
CPC ............ *G06F 3/03545* (2013.01); *G06F 3/038* (2013.01); *G06F 3/0325* (2013.01); *G06F 2203/0384* (2013.01)

(58) Field of Classification Search
CPC .............. G06F 3/03545; G06F 3/0346; G06F 2203/04106; G06F 3/038; G06F 2203/04108; G06F 3/0425; G06F 2203/04101; G06F 3/0325; G06F 2203/0384
See application file for complete search history.

(56) References Cited

U.S. PATENT DOCUMENTS

| | | | |
|---|---|---|---|
| 6,188,388 B1 | 2/2001 | Arita et al. | |
| 6,275,214 B1 | 8/2001 | Hansen | |
| 6,278,443 B1 * | 8/2001 | Amro et al. | 345/173 |
| 6,704,000 B2 * | 3/2004 | Carpenter | 345/158 |
| 7,683,881 B2 * | 3/2010 | Sun et al. | 345/156 |
| 7,705,864 B2 * | 4/2010 | Ahmed et al. | 345/667 |
| 7,956,842 B2 | 6/2011 | Ting | |
| 8,139,029 B2 * | 3/2012 | Boillot et al. | 345/158 |
| 8,149,215 B2 * | 4/2012 | Leung et al. | 345/158 |
| 2002/0122029 A1 * | 9/2002 | Murphy | 345/173 |
| 2005/0104849 A1 * | 5/2005 | Hoile | 345/157 |
| 2007/0030247 A1 * | 2/2007 | Yen et al. | 345/158 |
| 2007/0080940 A1 * | 4/2007 | Aoki et al. | 345/158 |
| 2008/0309619 A1 * | 12/2008 | Leung et al. | 345/158 |
| 2009/0048000 A1 * | 2/2009 | Ade-Hall | 455/566 |
| 2010/0113151 A1 * | 5/2010 | Yamashita et al. | 463/36 |
| 2010/0214218 A1 | 8/2010 | Vaisanen et al. | |
| 2011/0025603 A1 * | 2/2011 | Underkoffler et al. | 345/158 |
| 2011/0080490 A1 * | 4/2011 | Clarkson et al. | 348/222.1 |
| 2011/0292085 A1 * | 12/2011 | Jabori | 345/667 |

FOREIGN PATENT DOCUMENTS

| | | |
|---|---|---|
| CN | 1581045 A | 2/2005 |
| JP | 6-35607 A | 2/1994 |
| JP | 11-345087 | 12/1999 |
| JP | 3198783 B | 8/2001 |
| JP | 2005-234368 A | 9/2005 |
| JP | 4132061 B | 8/2008 |

* cited by examiner

Primary Examiner — Lun-Yi Lao
Assistant Examiner — Elliott Deaderick
(74) Attorney, Agent, or Firm — ALG Intellectual Property, LLC (57) ABSTRACT

A recognizing process in which an indicated first position is recognized on a display screen projected and displayed by a projector and a controlling process in which control is performed so as to display a cursor associated with the indication in a second position on the display screen are provided, and the cursor is displayed in the second position such that the cursor is displaced from the first position by a predetermined distance.

13 Claims, 9 Drawing Sheets

CURSOR DISPLAY DEVICE AND CURSOR DISPLAY METHOD

The entire disclosure of Japanese Patent Application No. 2011-85556, filed Apr. 7, 2011 is expressly incorporated by reference herein.

BACKGROUND

1. Technical Field

The present invention relates to cursor display devices and cursor display methods.

2. Related Art

In the past, a technique of projecting an image displayed on a display section of a computer terminal onto a screen by a projector, detecting, with a camera, a pen which is being used by the user to indicate the image projected on the screen, and displaying a cursor on the position of the detected pen by superimposing the cursor on the image projected on the screen has been known (see, for example, JP-A-2005-234368).

However, with the technique described above, that is, in an existing interactive system (unit) with a hovering function, the cursor is displayed hidden under part of the pen, which makes it hard to see the cursor.

SUMMARY

An advantage of some aspects of the invention is to provide a cursor display device that displays a cursor in an easy-to-see position and a cursor display method in a device using a pen to indicate an intended position on a display screen displayed on a screen and a display method used by the device.

An aspect of the invention is directed to a cursor display device including: an indicated position recognizing unit that recognizes a first position indicated by an indicating unit on a display screen projected and displayed by a projector; and a cursor display controlling unit that performs control so as to display a cursor associated with an indication given by the indicating unit in a second position on the display screen, and the cursor display controlling unit performs control so as to display the cursor in the second position such that the cursor is displaced from the first position by a predetermined distance.

With the configuration described above, since the cursor is displayed in a display position of the cursor, the display position displaced from the indicated position, the cursor is easily visible on the display screen.

Here, the indicated position recognizing unit and the cursor display controlling unit may be implemented by a controller built into the projector or may be implemented by a personal computer connected to the projector. When the projector has a built-in camera, it is preferable that the indicated position recognizing unit and the cursor display controlling unit be implemented by a controller built into the projector, and this eliminates the need to connect the personal computer to the projector.

Moreover, the direction of displacement from the indicated position to a display position of the cursor or the amount of displacement may be determined depending on an area on the display screen, the area to which the indicated position belongs.

With the configuration described above, since an optimum display position of the cursor can be determined depending on the area on the display screen, the cursor is made more visible.

Furthermore, the direction of displacement from the indicated position to a display position of the cursor or the amount of displacement may be determined depending on position information of the indicating unit.

With the configuration described above, since an optimum display position of the cursor is determined depending on the position information of the indicating unit, an optimum display position of the cursor can be determined depending on the position in which a person holding an indicating pen or a pointer as the indicating unit is standing or how the indicating pen is held, such as whether the person holds the indicating pen in his/her right hand or left hand. This makes the cursor more visible.

Moreover, the direction of displacement from the indicated position to a display position of the cursor or the amount of displacement may be determined depending on an indicated direction of the indicating unit.

With the configuration described above, since an optimum display position of the cursor can be determined depending on the direction in which the indicating unit is directed, the cursor is made more visible.

Furthermore, the direction of displacement from the indicated position to a display position of the cursor or the amount of displacement may be determined depending on the size of the display screen.

With the configuration described above, since an optimum display position of the cursor can be determined depending on the size of the display screen, the cursor is made more visible.

Moreover, the indicating unit may include an operation accepting unit that accepts an operation from a user, and, when the operation accepting unit accepts a cursor position moving operation for moving a display position of the cursor, the cursor display controlling unit may perform control so as to move the display position of the cursor in accordance with the cursor position moving operation and display the cursor in a position to which the display position of the cursor was moved.

With the configuration described above, it is possible to move a more visible cursor with ease.

Furthermore, an imaging unit that takes an image of the display screen and the first position may be provided, and the indicated position recognizing unit may recognize the first position based on an output of the imaging unit.

In addition, the information (the position information) of the tip of the indicating pen is a distance from the display screen to the projector.

With this configuration, the hovering distance from the display screen such as a screen is determined by taking an image with the imaging unit such as a camera, and the amount of displacement of the cursor position is varied depending on the hovering distance, whereby the cursor display position and the tip of the indicating pen do not interfere with each other. The imaging unit such as a camera may be a camera, a CIS sensor, and a CMOS sensor which are built into the projector or a camera provided separately from the projector.

Another aspect of the invention is directed to a cursor display method including: recognizing an indicated first position on a display screen projected and displayed by a projector; and controlling a cursor associated with the indication so as to be displayed in a second position on the display screen, wherein the cursor is displayed in the second position such that the cursor is displaced from the first position by a predetermined distance.

Still another aspect of the invention is directed to a cursor display method including: performing calibration of a display position on a projected screen projected by a projector and an indicated position indicated by an indicating unit; and thereafter performing cursor display such that a cursor position associated with an indication given by the indicating unit is displaced from the indicated position when a determination is made that the indicating unit is in a hovering state.

With this method, in a state (a hovering state) in which a space is left between the indicating pen and the display screen such as a screen after the position of a pen tip and the cursor display position on the display screen are made to coincide with each other temporarily by temporarily performing common calibration in an interactive unit by touching a calibration position of a projection display screen such as a screen by using the indicating unit such as the indicating pen, the cursor position can be displayed by being displaced from the position of the pen tip by a predetermined amount. Therefore, it is possible to prevent the cursor position from interfering with the pen tip and becoming invisible in the hovering state.

Furthermore, it is preferable that, in the hovering state, the amount of displacement of the cursor position be increased with increase in the amount of hovering.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
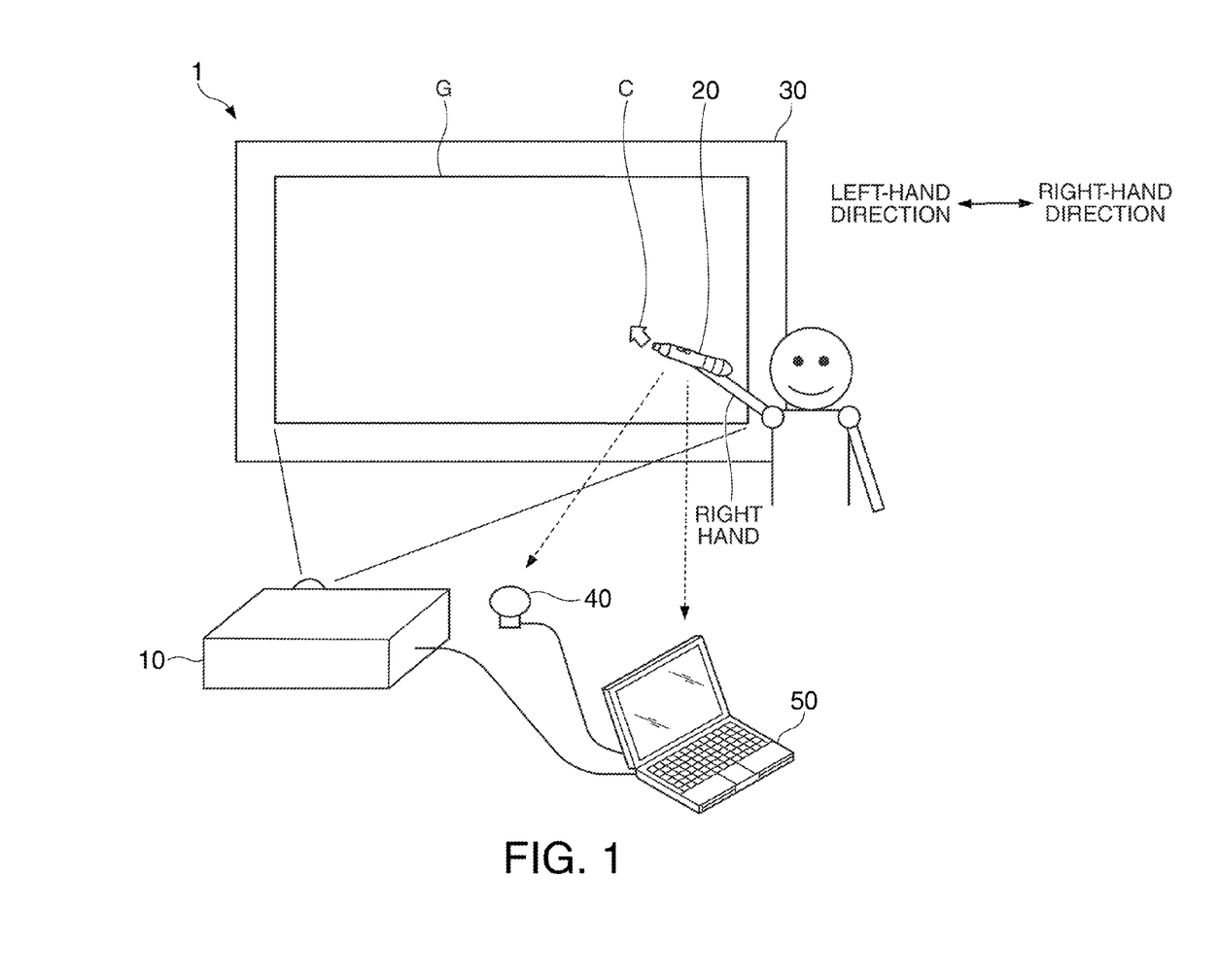
FIG. 1 is a schematic diagram showing the usage state of a cursor display device according to an embodiment of the invention.
Figure 2A:
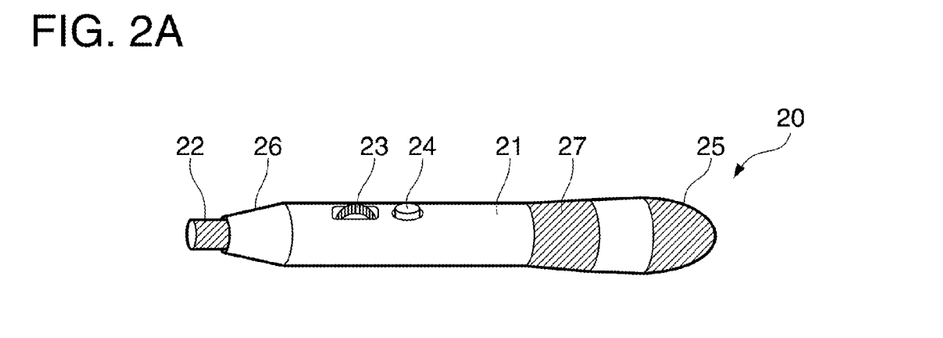
FIGS. 2A to 2C are schematic appearance diagrams of an indicating pen shown in FIG. 1 and schematic diagrams showing the usage state of the indicating pen, FIG. 2A showing an example of the indicating pen, FIG. 2B showing a state in which a right-handed person is using the indicating pen on the right side of a screen, and FIG. 2C showing a state in which the right-handed person is using the indicating pen on the left side of the screen.
Figure 2B:
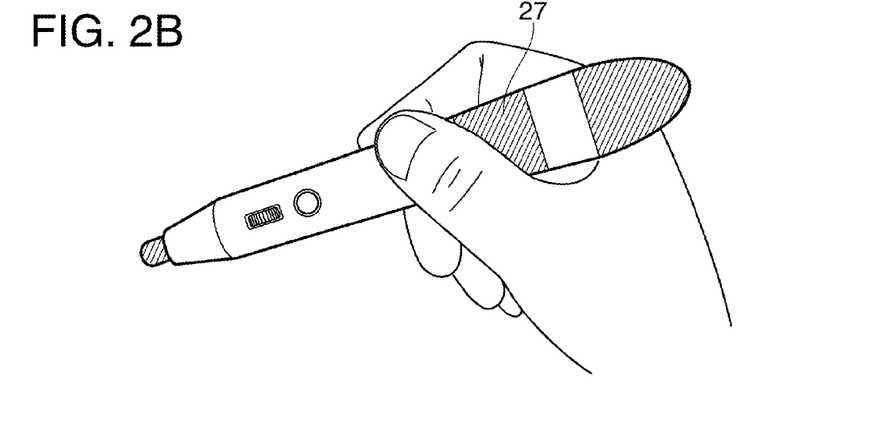
Figure 2C:
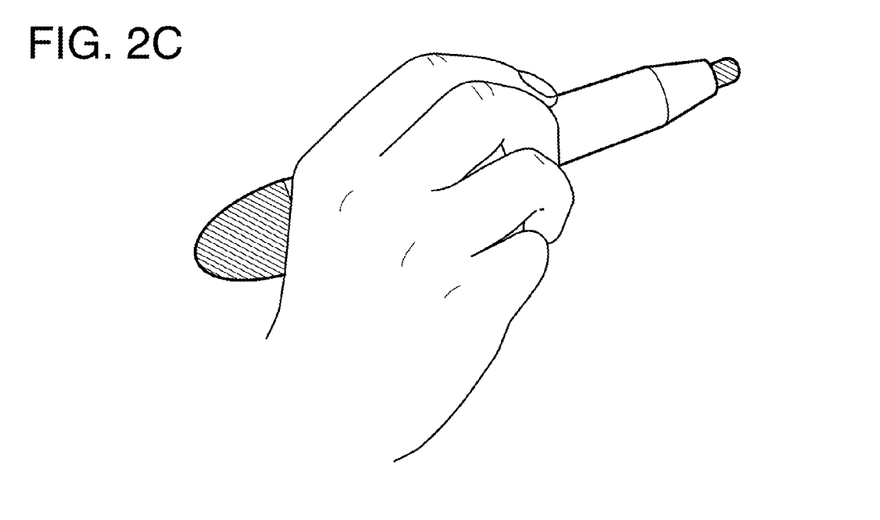

Hereinafter, an embodiment of the invention will be described in detail with reference to the drawings. FIG. 1 is a schematic diagram showing the usage state of a cursor display system 1 according to the embodiment of the invention. FIGS. 2A to 2C are schematic appearance diagrams of an indicating pen 20 and schematic diagrams showing the usage state of the indicating pen 20.

The cursor display system 1 is formed of a projector 10, the indicating pen 20, a camera 40, and a personal computer 50. The projector 10 receives an image input from the personal computer 50 and projects the image onto a screen 30.

The indicating pen 20 is a pen for indicating an intended position on a display screen G (a projected image) displayed on the screen 30. As shown in FIG. 2A, the appearance of the indicating pen 20 is formed of a main body 21 and an indicating section 22. In the main body 21, a scroll button 23 and a push button 24 are disposed. The scroll button 23 and the push button 24 are operation accepting units that accept an operation (for example, movement, selection, and execution) on the display screen G from the user.

A bottom portion 25 of the main body 21 functions as a light-emitting unit (a first light-emitting unit) that emits an infrared light (infrared radiation). For example, by disposing an infrared LED inside the bottom portion 25, the bottom portion 25 may be made to function as the light-emitting unit (the first light-emitting unit). The infrared light emitted from the bottom portion 25 is detected by the camera 40 (see a dashed line in FIG. 1).

As is the case with the bottom portion 25, a ring portion 27 of the main body 21 functions as a light-emitting unit (a third light-emitting unit) that emits an infrared light (infrared radiation) with an infrared LED disposed inside. The infrared light emitted from the ring portion 27 is detected by the camera 40 (see the dashed line in FIG. 1).

The indicating section 22 is provided in a top portion 26 of the main body 21. The indicating section 22 is an indicating unit by which the user indicates an intended position on the display screen G. That is, the user holding the indicating pen 20 indicates an intended position on the display screen G by using the indicating section 22.

Moreover, in addition to the indicating unit described above, the indicating section 22 also functions as an operation accepting unit that accepts an operation on the display screen G from the user.

Furthermore, the indicating section 22 also functions as a light-emitting unit (a second light-emitting unit) that emits an infrared light. For example, by disposing an infrared LED inside the indicating section 22 (or the top portion 26), the indicating section 22 may be made to function as the light-emitting unit. The infrared light emitted from the indicating section 22 is detected by the camera 40 (see the dashed line in FIG. 1).

In addition, the indicating pen 20 has a radio communication module (a radio communication unit) and performs radio communication with the personal computer 50. For example, the indicating pen 20 transmits information based on the operation performed by the user, that is, the operation information accepted from the user via the operation accepting unit to the personal computer 50 (see a dotted line in FIG. 1). In other words, the information on a button operation etc. performed in the indicating pen 20 is transmitted to the personal computer 50 by the radio communication unit.

In the indicating pen 20, depending on, for example, how the main body 21 is held, there is a case in which the infrared lights from three points: the bottom portion 25 (the first light-emitting unit), the indicating section 22 (the second light-emitting unit), and the ring portion 27 (the third light-emitting unit) are detected by the camera 40, and a case in which the infrared lights from two points: the bottom portion 25 and the indicating section 22 are detected by the camera 40. For example, as shown in FIG. 2B, when the user holds the indicating pen 20 with his/her right hand on the right side of the screen 30, at least part of the ring portion 27 is likely to be seen from the side where the camera 40 is located. Therefore, the infrared lights from three points: the bottom portion 25, the indicating section 22, and the ring portion 27 are detected by the camera 40. On the other hand, as shown in FIG. 2C, when the user holds the indicating pen 20 with his/her right hand on the left side of the screen 30, the ring portion 27 is likely to become invisible from the side where the camera 40 is located. Therefore, the infrared lights from two points: the bottom portion 25 and the indicating section 22 are detected by the camera 40.

The way in which the indicating pen 20 is inclined (an indicated direction of the indicating pen 20) is determined as follows based on the positional relationship between the position of an image-taken region of the bottom portion 25 and the position of an image-taken region of the indicating section 22.

When the infrared lights from three points: the bottom portion 25, the indicating section 22, and the ring portion 27 of the indicating pen 20 are detected by the camera 40, of two detected portions in two points: the bottom portion 25 and the indicating section 22, a detected portion with a greater area is identified as an image-taken region of the bottom portion 25 and a detected portion with a smaller area is identified as an image-taken region of the indicating section 22, whereby the inclination of the indicating pen 20 is determined.

On the other hand, when the infrared lights from two points: the bottom portion 25 and the indicating section 22 of the indicating pen 20 are detected by the camera 40, of two detected portions in these two points, a detected portion with a greater area is identified as an image-taken region of the bottom portion 25, and a detected portion with a smaller area is identified as an image-taken region of the indicating section 22, whereby the inclination of the indicating pen 20 is determined. Incidentally, the identification of the individual sections (the bottom portion 25, the indicating section 22, and the ring portion 27) of the indicating pen 20 described above and the determination of the inclination of the indicating pen 20 are performed in the personal computer 50 based on the images taken by the camera 40.

Moreover, it is possible to determine whether a surface of the indicating pen 20, the surface seen from the side where the camera 40 is located, is a front surface or a back surface of the indicating pen 20 based on the presence or absence of the detection of the infrared light from the ring portion 27 by the camera 40. For example, in the indicating pen 20, when a surface on which the scroll button 23 and the push button 24 are disposed as shown in FIG. 2B is defined as a front surface, when the infrared light from the ring portion 27 is detected, a surface of the indicating pen 20, the surface seen from the side where the camera 40 is located, is determined as a front surface; when the infrared light from the ring portion 27 is not detected, a surface of the indicating pen 20, the surface seen from the side where the camera 40 is located, is determined as a back surface. Incidentally, the above determination is performed in the personal computer 50 based on the images taken by the camera 40.

Furthermore, for example, it is possible to determine the position information of the indicating pen 20 (on which side of the screen 30 the user is standing) based on the presence or absence of the detection of the infrared light from the ring portion 27. For example, in the case of a right-handed user (a user who holds the indicating pen 20 with his/her right hand), when the infrared light from the ring portion 27 is detected, the user may be determined as standing on the right side of the screen 30 as shown in FIG. 1; when the infrared light from the ring portion 27 is not detected, the user may be determined as standing on the left side of the screen 30. Incidentally, the above determination is performed in the personal computer 50 based on the images taken by the camera 40.

Incidentally, the user is made to specify whether he/she is right-handed or left-handed as position information of the indicating pen 20 when the user starts using the indicating pen 20. The method of specification may be a method by which specification is made by using the personal computer 50 or a method by which specification is made by using the indicating pen 20.

As the method by which specification is made by using the indicating pen 20, there is, for example, a method by which specification is made by the operation of the indicating pen 20 (the operation accepting unit) and a method by which specification is made by the movement of the indicating pen 20 by using the detection of the infrared light by the camera 40. That is, there is a method by which a user's dominant hand is specified through the use of an operation button of the indicating pen 20 and a method by which a user's dominant hand is specified by the movement (for example, the inclination) of the indicating pen 20.

Incidentally, in addition to the above-described method by which the position information of the indicating pen 20 is determined based on the presence or absence of the detection of the infrared light from the ring portion 27, the methods for determining the position information of the indicating pen 20 (the position in which the user is standing) include the following method. For example, the position of the user (for example, a face which is a heat source) is identified by the camera 40, whereby it is possible to determine the position in which the user is standing based on the positional relationship between the position of the user and the position of the indicating pen 20 (for example, the bottom portion 25 or the indicating section 22). Incidentally, the above determination is performed in the personal computer 50 based on the images taken by the camera 40.

The camera 40 is an infrared camera that detects the infrared lights emitted from the individual sections of the indicating pen 20. The camera 40 takes an image in a direction in which the screen 30 is located and outputs the taken images (moving images or still images serially taken) to the personal computer 50.

The personal computer 50 outputs an image for a presentation, for example, to the projector 10.

Moreover, the personal computer 50 has a radio communication unit and performs radio communication with the indicating pen 20. For example, the personal computer 50 receives information in accordance with the operation performed by the user from the indicating pen 20.

Furthermore, the personal computer 50 identifies the image-taken regions of the individual sections (for example, the bottom portion 25 and the indicating section 22) of the indicating pen 20 based on the images taken by the camera 40. In addition, the personal computer 50 performs various kinds of determinations such as the determination of the way in which the indicating pen 20 is inclined, the determination as to the front and back surfaces of the indicating pen 20, and the determination of the position information of the indicating pen 20 (the determination of the position in which the user is standing).

In addition, the personal computer 50 determines a dominant hand of the user who uses the indicating pen 20. For example, the personal computer 50 determines a dominant hand of the user who uses the indicating pen 20 based on the radio communication with the indicating pen 20 or the images taken by the camera 40.

Moreover, the personal computer 50 displays a cursor C representing an indication given by the indicating pen 20 on the display screen G based on the images taken by the camera 40. Hereinafter, cursor C display control performed by the personal computer 50 will be described.

The personal computer 50 performs control so as to recognize an indicated position on the display screen G, the indicated position indicated by the indicating pen 20, and display the cursor C in a position that is different from the indicated position. Specifically, the personal computer 50 performs control so as to determine the cursor position in a position that is different from the indicated position and display the cursor C in the cursor position thus determined. In other words, the personal computer 50 includes an indicated position recognizing unit that recognizes an indicated position on the display screen G, the indicated position indicated by the indicating pen 20, and a cursor display controlling unit that determines a cursor position in a position that is displaced from the indicated position and displays the cursor C in the cursor position thus determined.

Indicated Position Recognizing Unit

The indicated position recognizing unit of the personal computer 50 will be described. The personal computer 50 recognizes an indicated position on the display screen G, the indicated position indicated by the indicating pen 20, based on the taken images obtained from the camera 40. Specifically, the personal computer 50 identifies an image-taken region of the indicating section 22 based on the taken images and recognizes the image-taken region as an indicated position.

More specifically, the personal computer 50 searches for an infrared light detected portion (region) from the taken images. When the personal computer 50 found two detected portions, the personal computer 50 recognizes a detected portion with a smaller area as an indicated position (an image-taken region of the indicating section 22); when the personal computer 50 found three detected portions, the personal computer 50 recognizes a detected portion with a smaller area of the detected portions on both ends as an indicated position (an image-taken region of the indicating section 22).

Cursor Display Controlling Unit

The cursor display controlling unit of the personal computer 50 will be described. Specifically, by using FIGS. 3A to 3C to FIGS. 8A and 8B, a method for determining a cursor position based on an indicated position (an image-taken region of the indicating section 22 of the indicating pen 20), that is, a method for determining the direction of displacement from an indicated position to a cursor position or the amount of displacement will be described. FIGS. 3A to 3C to FIGS. 8A and 8B are explanatory diagrams for explaining the positional relationship between the indicating pen 20 and the cursor C.

The personal computer 50 determines the direction of displacement from an indicated position to a cursor position or the amount of displacement depending on the area on the display screen G, the area to which the indicated position belongs.

For example, the personal computer 50 may determine the direction of displacement or the amount of displacement depending on the area obtained by division in a lateral direction. For example, when the indicated position recognizing unit recognizes an indicated position $P_1$ in a lateral middle area (see FIG. 3A) on the display screen G, the personal computer 50 determines a position obtained by displacing the indicated position $P_1$, as a starting point, in an upper-left direction by a length L1 as a cursor position $P_2$ as shown in FIG. 3B. Moreover, when the indicated position recognizing unit recognizes the indicated position $P_1$ in a left-hand area or a right-hand area on the display screen G, the personal computer 50 determines a position obtained by displacing the indicated position $P_1$, as a starting point, in an upper-left direction by a length L2 (L2>L1) as a cursor position $P_2$ as shown in FIG. 3C.

Figure 3A:
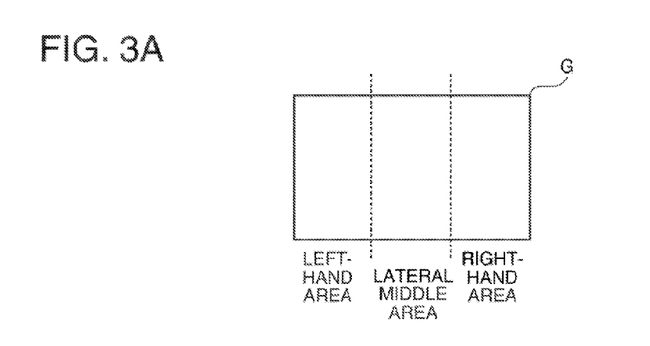
FIGS. 3A to 3C are explanatory diagrams of the positional relationship between the indicating pen and a cursor, FIG. 3A showing the lateral division of an indication area, FIG. 3B showing the positional relationship between the indicating pen and the cursor when an indicated position is present in a middle area, and FIG. 3C showing the positional relationship between the indicating pen and the cursor when the indicated position is present in a left-hand or right-hand area.
Figure 3B:
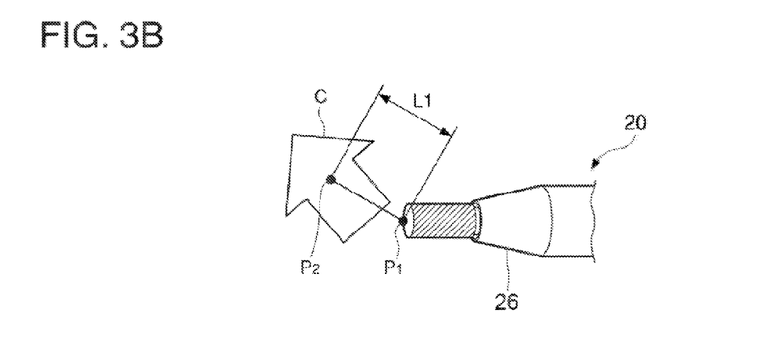
Figure 3C:
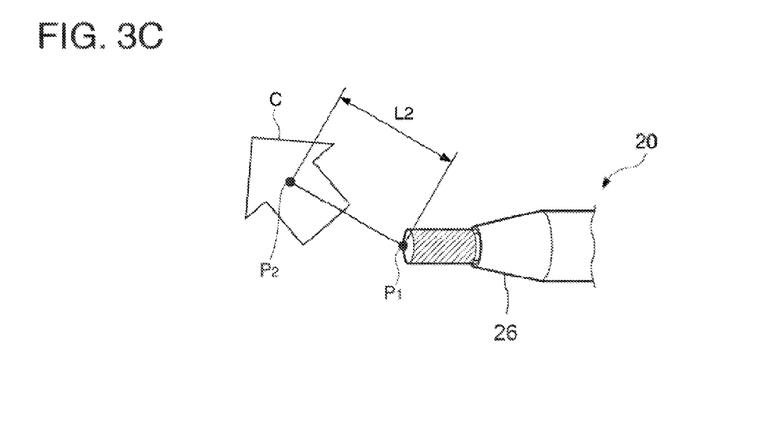

Incidentally, in an example shown in FIGS. 3A to 3C, the direction of displacement when the indicated position $P_1$ belongs to the lateral middle area is the same as the direction of displacement when the indicated position $P_1$ belongs to the left-hand area or the right-hand area. However, the direction of displacement when the indicated position $P_1$ belongs to the lateral middle area may be different from the direction of displacement when the indicated position $P_1$ belongs to the left-hand area or the right-hand area (see FIGS. 4B to 4D).

Figure 4A:
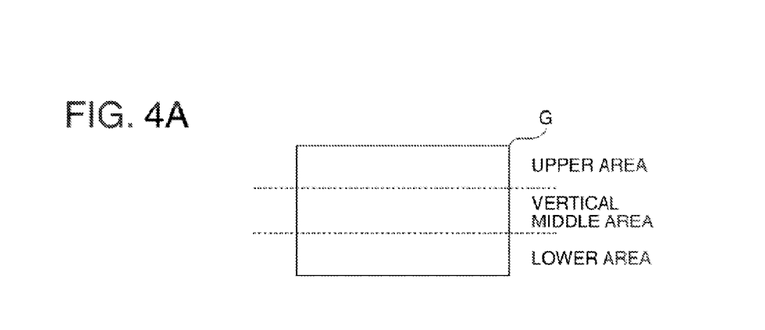
FIGS. 4A to 4D are explanatory diagrams of the positional relationship between the indicating pen and the cursor, FIG. 4A showing the vertical division of the indication area, FIG. 4B showing the positional relationship between the indicating pen and the cursor when the indicated position is present in an upper area, FIG. 4C showing the positional relationship between the indicating pen and the cursor when the indicated position is present in a middle area, and FIG. 4D showing the positional relationship between the indicating pen and the cursor when the indicated position is present in a lower area.
Figure 4B:
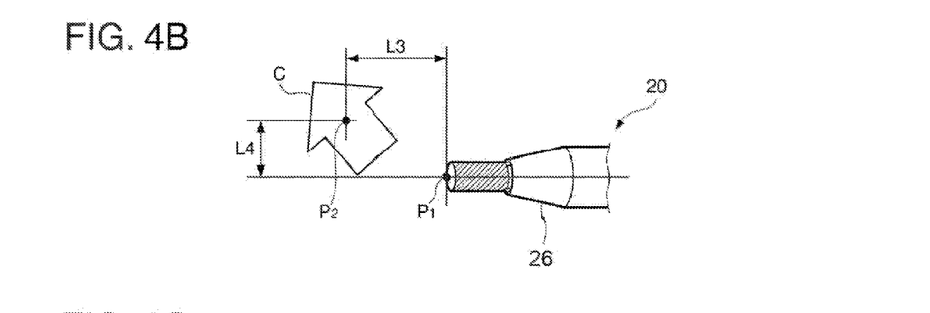
Figure 4C:
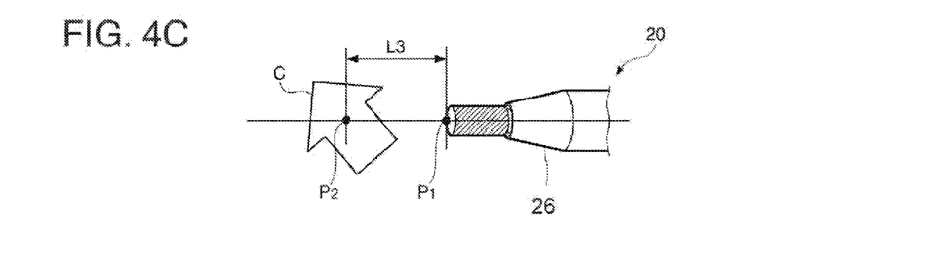
Figure 4D:
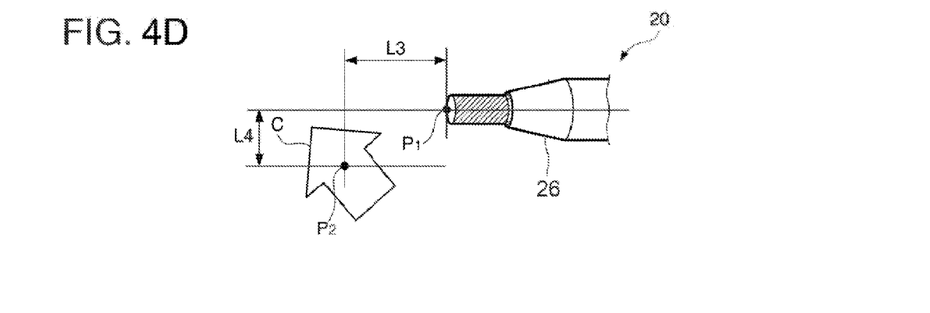

Moreover, for example, the personal computer 50 may determine the direction of displacement or the amount of displacement depending on the area obtained by division in a vertical direction. For example, when an indicated position $P_1$ belongs to an upper area (see FIG. 4A) on the display screen G, the personal computer 50 determines a position obtained by displacing the indicated position $P_1$, as a starting point, leftward by a length L3 and upward by a length L4 as a cursor position $P_2$. Furthermore, when the indicated position $P_1$ belongs to a vertical middle area on the display screen G, the personal computer 50 determines a position obtained by displacing the indicated position $P_1$, as a starting point, leftward by a length L3 as a cursor position $P_2$ as shown in FIG. 4C. In addition, when the indicated position $P_1$ belongs to a lower area on the display screen G, the personal computer 50 determines a position obtained by displacing the indicated position $P_1$, as a starting point, leftward by a length L3 and downward by a length L4 as a cursor position $P_2$ as shown in FIG. 4D.

Incidentally, in an example shown in FIGS. 4A to 4D, the direction of displacement when the indicated position $P_1$ belongs to the vertical middle area, the direction of displacement when the indicated position $P_1$ belongs to the upper area, and the direction of displacement when the indicated position $P_1$ belongs to the lower area are different from one another. However, as in FIGS. 3A to 3C, the direction of displacement when the indicated position $P_1$ belongs to the vertical middle area, the direction of displacement when the indicated position $P_1$ belongs to the upper area, and the direction of displacement when the indicated position $P_1$ belongs to the lower area may be identical to one another.

Moreover, the personal computer 50 may determine the direction of displacement from an indicated position $P_1$ to a cursor position $P_2$ or the amount of displacement depending on whether the indicating pen 20 is held by a right hand or a left hand. Specifically, when the indicating pen 20 is held by a right hand, the personal computer 50 may determine a position obtained by displacing an indicated position $P_1$, as a starting point, in an upper-left direction, leftward, or a lower-left direction as a cursor position $P_2$; when the indicating pen 20 is held by a left hand, the personal computer 50 may determine a position obtained by displacing an indicated position $P_1$, as a starting point, in an upper-right direction, rightward, or a lower-right direction as a cursor position $P_2$. For example, an example shown in FIG. 1 is a case in which, since the indicating pen 20 is held by a right hand, a position obtained by displacing an indicated position $P_1$, as a starting point, in an upper-left direction is determined as a cursor position $P_2$ (in FIG. 1, $P_1$ and $P_2$ are not shown).

Incidentally, the personal computer 50 determines a dominant hand of the user who uses the indicating pen 20 by the radio communication with the indicating pen 20 or based on the images taken by the camera 40. When the user is right-handed, the personal computer 50 determines that the indicating pen 20 is held by a right hand; when the user is left-handed, the personal computer 50 determines that the indicating pen 20 is held by a left hand.

Moreover, the personal computer 50 may determine the direction of displacement from an indicated position $P_1$ to a cursor position $P_2$ or the amount of displacement depending on whether a person (a user) who holds the indicating pen 20 is located on the right side or the left side of the screen 30. Specifically, when the user is standing on the right side of the screen 30, the personal computer 50 may determine a position obtained by displacing an indicated position $P_1$, as a starting point, in an upper-left direction, leftward, or a lower-left direction as a cursor position $P_2$; when the user is standing on the left side of the screen 30, the personal computer 50 may determine a position obtained by displacing an indicated position $P_1$, as a starting point, in an upper-right direction, rightward, or a lower-right direction as a cursor position $P_2$. For example, an example shown in FIG. 1 is a case in which, since the user is standing on the right side of the screen 30, a position obtained by displacing an indicated position $P_1$, as a starting point, in an upper-left direction is determined as a cursor position $P_2$ (in FIG. 1, $P_1$ and $P_2$ are not shown).

Incidentally, the personal computer 50 determines a position in which the user is standing based on the user's dominant hand and the presence or absence of the detection of the infrared light from the ring portion 27. More specifically, the personal computer 50 determines a position in which the user is standing based on a combination of the user's dominant hand obtained by the determination and the presence or absence of the detection of the infrared light from the ring portion 27 based on the taken images obtained from the camera 40. For example, when the user is right-handed and the infrared light from the ring portion 27 is detected, the personal computer 50 determines that the user is standing on the right side of the screen 30; when the user is right-handed and the infrared light from the ring portion 27 is not detected, the personal computer 50 determines that the user is standing on the left side of the screen 30. Moreover, when the user is left-handed and the infrared light from the ring portion 27 is detected, the personal computer 50 determines that the user is standing on the left side of the screen 30; when the user is left-handed and the infrared light from the ring portion 27 is not detected, the personal computer 50 determines that the user is standing on the right side of the screen 30.

Moreover, the personal computer 50 may determine the direction of displacement from an indicated position $P_1$ to a cursor position $P_2$ or the amount of displacement depending on an indicated direction (a direction from the bottom portion 25 to the indicating section 22) of the indicating pen 20. For example, the personal computer 50 may determine the direction of displacement or the amount of displacement depending on whether the indicated direction is an upward direction or a downward direction.

That is, when the indicated direction is any one of an upper-left direction, a vertical upward direction, and an upper-right direction, the personal computer 50 may determine a position obtained by displacing an indicated position $P_1$, as a starting point, in an upper-left direction, a vertical upward direction, or an upper-right direction as a cursor position $P_2$; when the indicated direction is any one of a lower-left direction, a vertical downward direction, and a lower-right direction, the personal computer 50 may determine a position obtained by displacing an indicated position $P_1$, as a starting point, in a lower-left direction, a vertical downward direction, or a lower-right direction as a cursor position $P_2$. Incidentally, when the indicated direction is a horizontal direction and is neither an upward direction nor a downward direction, the personal computer 50 may determine a position obtained by displacing an indicated position $P_1$ in the indicated direction (in a right-hand or left-hand direction) as a cursor position $P_2$.

Figure 5A:
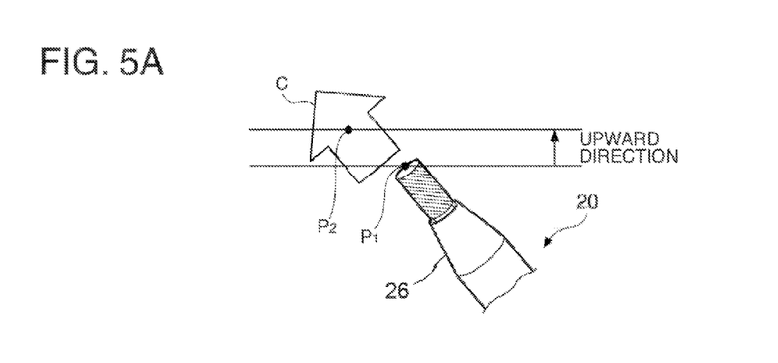
FIGS. 5A to 5C are explanatory diagrams of the positional relationship between the indicating pen and the cursor, FIG. 5A showing the positional relationship between the indicating pen and the cursor when an indicated direction is an upward direction, FIG. 5B showing the positional relationship between the indicating pen and the cursor when the indicated direction is a horizontal direction, and FIG. 5C showing the positional relationship between the indicating pen and the cursor when the indicated direction is a downward direction.
Figure 5B:
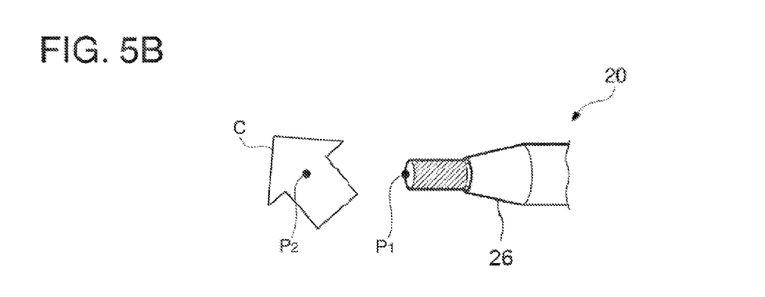
Figure 5C:
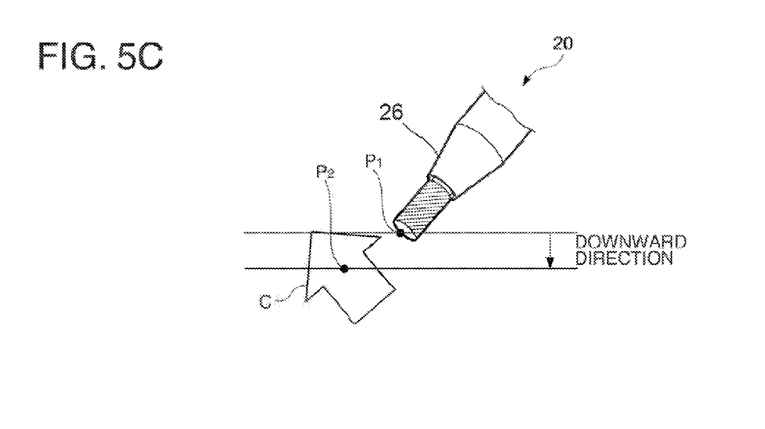

For example, when the indicated direction is an upper-left direction as shown in FIG. 5A, the personal computer 50 may determine a position obtained by displacing an indicated position $P_1$, as a starting point, in an upper-left direction as a cursor position $P_2$; when the indicated direction is a lower-left direction as shown in FIG. 5C, the personal computer 50 may determine a position obtained by displacing an indicated position $P_1$, as a starting point, in a lower-left direction as a cursor position $P_2$. Moreover, as shown in FIG. 5B, when the indicated direction is a left-hand direction, the personal computer 50 may determine a position obtained by displacing an indicated position $P_1$, as a starting point, in a left-hand direction as a cursor position $P_2$.

Furthermore, the personal computer 50 may determine the direction of displacement or the amount of displacement depending on whether the indicated direction is a left-hand direction or a right-hand direction.

That is, when the indicated direction is any one of an upper-left direction, a left-hand direction, and a lower-left direction, the personal computer 50 may determine a position obtained by displacing an indicated position $P_1$, as a starting point, in an upper-left direction, a left-hand direction, or a lower-left direction as a cursor position $P_2$; when the indicated direction is any one of an upper-right direction, a right-hand direction, and a lower-right direction, the personal computer 50 may determine a position obtained by displacing an indicated position $P_1$, as a starting point, in an upper-right direction, a right-hand direction, or a lower-right direction as a cursor position $P_2$. Incidentally, when the indicated direction is a vertical direction (a vertical upward direction or a vertical downward direction) and is neither a left-hand direction nor a right-hand direction, the personal computer 50 may determine a position obtained by displacing an indicated position $P_1$ in the indicated direction (a vertical upward direction or a vertical downward direction) as a cursor position $P_2$.

Figure 6A:
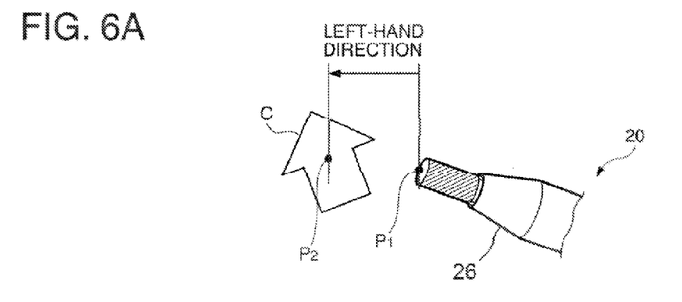
FIGS. 6A to 6C are explanatory diagrams of the positional relationship between the indicating pen and the cursor, FIG. 6A showing the positional relationship between the indicating pen and the cursor when the indicated direction is a left-hand direction, FIG. 6B showing the positional relationship between the indicating pen and the cursor when the indicated direction is a perpendicular direction, and FIG. 6C showing the positional relationship between the indicating pen and the cursor when the indicated direction is a right-hand direction.
Figure 6B:
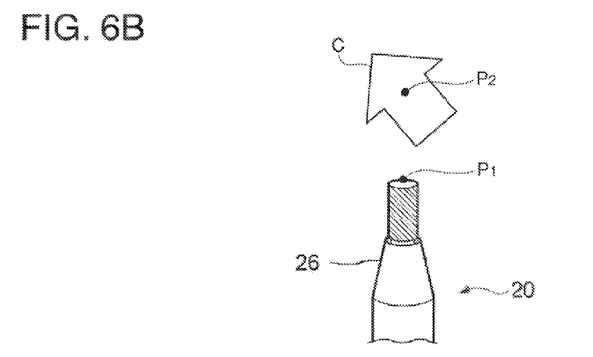
Figure 6C:
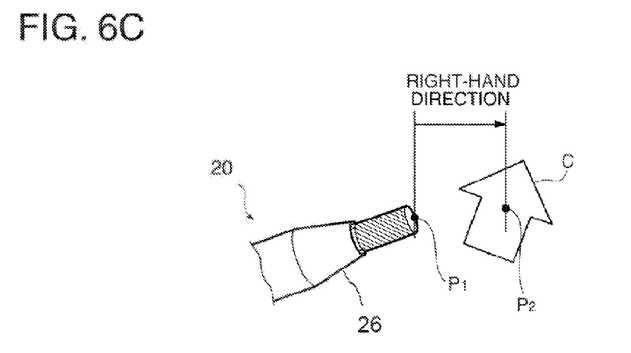

For example, when the indicated direction is an upper-left direction as shown in FIG. 6A, the personal computer 50 may determine a position obtained by displacing an indicated position $P_1$, as a starting point, in an upper-left direction as a cursor position $P_2$; when the indicated direction is an upper-right direction as shown in FIG. 6C, the personal computer 50 may determine a position obtained by displacing an indicated position $P_1$, as a starting point, in an upper-right direction as a cursor position $P_2$. Moreover, when the indicated direction is a vertical upward direction as shown in FIG. 6B, the personal computer 50 may determine a position obtained by displacing an indicated position $P_1$, as a starting point, in a vertical upward direction as a cursor position $P_2$.

Figure 7A:
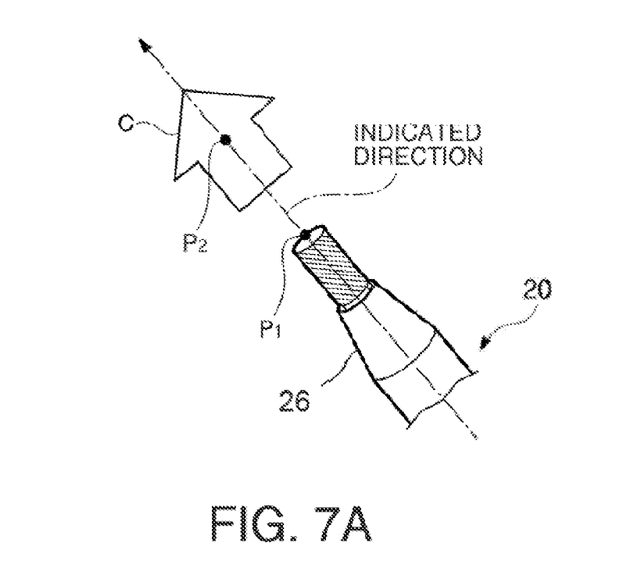
FIGS. 7A and 7B are explanatory diagrams of the positional relationship between the indicating pen and the cursor, FIG. 7A showing the positional relationship between the indicating pen and the cursor when the indicated direction is an upper-left direction and FIG. 7B showing the positional relationship between the indicating pen and the cursor when the indicated direction is a lower-right direction.
Figure 7B:
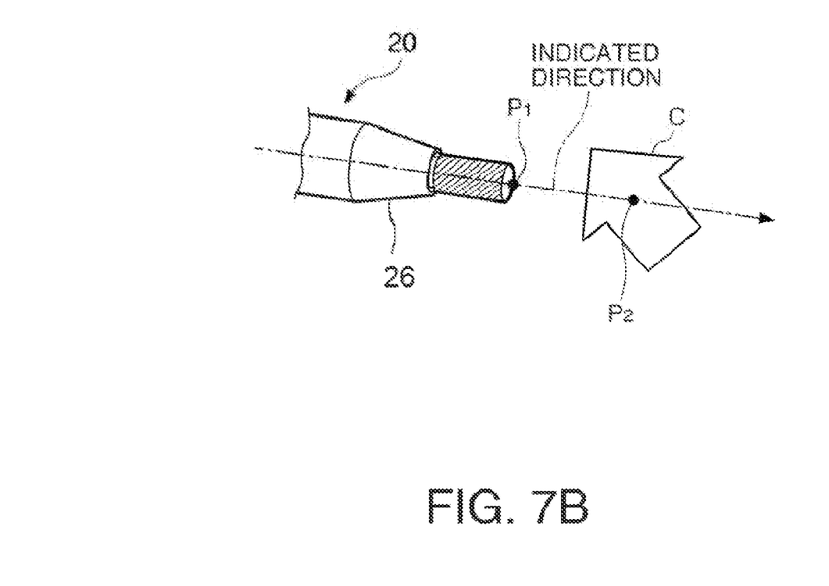

Furthermore, as shown in FIGS. 7A and 7B, the personal computer 50 may determine a position obtained by displacing an indicated position $P_1$, as a starting point, in the same direction as the indicated direction as a cursor position $P_2$.

In addition, the personal computer 50 may determine the direction of displacement from an indicated position $P_1$ to a cursor position $P_2$ or the amount of displacement depending on the size of the display screen G.

Figure 8A:
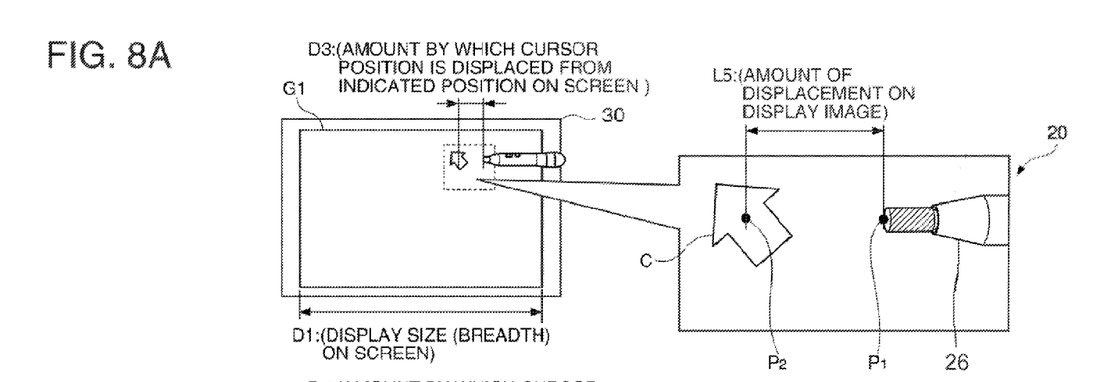
FIGS. 8A and 8B are explanatory diagrams of the positional relationship between the indicating pen and the cursor, FIG. 8A showing the positional relationship between the indicating pen and the cursor when the display size of a display screen is more than or equal to a predetermined value and FIG. 8B showing the positional relationship between the indicating pen and the cursor when the display size of the display screen is less than the predetermined value.
Figure 8B:
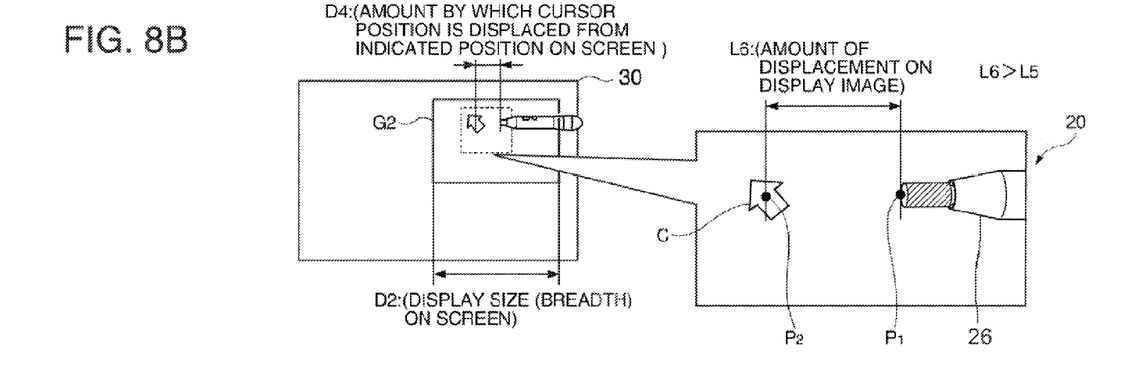

Specifically, a threshold value DS (not shown) for determining the breadth of the display screen G, the amount of displacement L6 when the breadth of the display screen G is less than the threshold value DS, and the amount of displacement L5 when the breadth of the display screen G is more than or equal to the threshold value DS are determined in advance (L6>L5). When the personal computer 50 determines that the breadth D1 of a display screen G1 is more than or equal to the threshold value DS, the personal computer 50 determines a position obtained by displacing an indicated position $P_1$, as a starting point, leftward by L5 as a cursor position $P_2$ as shown in FIG. 8A. Moreover, when the personal computer 50 determines that the breadth D2 of a display screen G2 is less than the threshold value DS, the personal computer 50 determines a position obtained by displacing an indicated position $P_1$, as a starting point, leftward by L6 as a cursor position $P_2$ as shown in FIG. 8B. That is, when the amount (D3) by which a cursor position $P_2$ is displaced from an indicated position $P_1$ on the screen 30 shown in FIG. 8A is made to be nearly equal to the amount (D4) by which a cursor position $P_2$ is displaced from an indicated position $P_1$ on the screen 30 shown in FIG. 8B (when D3 is made to be nearly equal to D4), the amount of displacement L6 has to be made greater than the amount of displacement L5. Therefore, the personal computer 50 makes the amount of displacement L6 greater than the amount of displacement L5.

Incidentally, the amount of displacement L6 when the breadth of the display screen G is less than the threshold value DS simply has to be greater than or equal to the amount of displacement L5 when the breadth of the display screen G is more than or equal to the threshold value DS, and the amount of displacement L5 and the amount of displacement L6 do not necessarily have to be fixed values. That is, the amount of displacement L5 and the amount of displacement L6 may be determined in accordance with other conditions (the conditions shown in FIGS. 3A to 3C to FIGS. 7A and 7B).

Moreover, there are various kinds of methods by which the personal computer 50 detects the size of the display screen G projected on the screen 30. For example, a display screen for size detection that outputs a predetermined mark may be displayed on the screen 30, whereby the size of the display screen G is detected based on the size of an image-taken region of the predetermined mark on the display screen for size detection that was taken by the camera 40.

Figure 9:
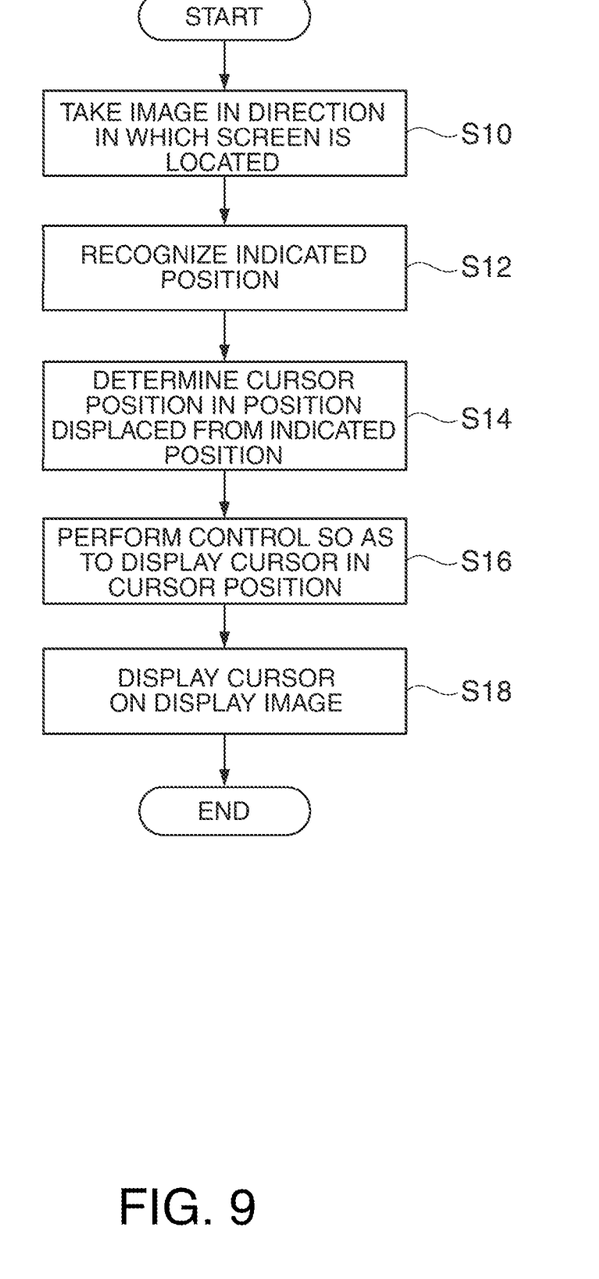
FIG. 9 is a flowchart showing an example of the operation of the cursor display device.

Next, the operation of the cursor display system 1 will be described by using FIG. 9. FIG. 9 is a flowchart showing an example of the operation of the cursor display system 1. Incidentally, it is assumed that, at START of the flowchart shown in FIG. 9, the projector 10 is projecting an image input thereto from the personal computer 50 onto the screen 30.

The camera 40 takes an image in a direction in which the screen 30 is located (step S10). The camera 40 outputs the taken images (moving images or still images serially taken) to the personal computer 50. The personal computer 50 recognizes an indicated position $P_1$ (an image-taken region of the indicating section 22 of the indicating pen 20) based on the taken images (step S12).

The personal computer 50 determines a cursor position $P_2$ in a position displaced from the indicated position $P_1$ by the method described by using FIGS. 3A to 3C to FIGS. 8A and 8B (step S14). The personal computer 50 performs control so as to display the cursor C in the cursor position $P_2$ thus determined (step S16).

The projector 10 displays the cursor C on the display screen G displayed on the screen 30 (step S18).

Then, this flowchart is ended.

As described above, according to the cursor display system 1, since the cursor C is displayed in the cursor position $P_2$ displaced from the indicated position $P_1$, even when the user brings the indicating pen 20 closer to the screen 30, the cursor C is not hidden under the user's hand or the indicating pen 20 on the display screen. This makes it easy to see the cursor C.

Incidentally, in the embodiment described above, as shown in FIG. 1, the projector 10, the camera 40, and the personal computer 50 are provided separately. However, the projector 10 and the camera 40 may be integrated together and the projector 10 may be provided with the function of the camera 40. Alternatively, the personal computer 50 and the camera 40 may be integrated together and the personal computer 50 may be provided with the function of the camera 40. Moreover, the projector 10 may be provided with part (for example, the indicated position recognizing unit or the cursor display controlling unit) or all of the functions of the personal computer 50. Furthermore, in place of the personal computer 50, a special purpose machine having at least the indicated position recognizing unit and the cursor display controlling unit may be used.

Moreover, in FIGS. 3A to 3C, an example in which the display screen G is divided into three areas in a lateral direction has been described. However, the display screen G may be divided in two or four or more areas in a lateral direction. Furthermore, in FIGS. 4A to 4D, an example in which the display screen G is divided into three areas in a vertical direction has been described. However, the display screen G may be divided into two or four or more areas in a vertical direction. In addition, the display screen G may be divided into areas in a lateral direction and a vertical direction (for example, into nine areas consisting of three rows and three columns, twelve areas consisting of four rows and three columns, and sixteen areas consisting of four rows and four columns).

Moreover, in a case in which the direction of displacement from an indicated position to a cursor position or the amount of displacement is determined depending on the size of the display screen G, in the description of FIGS. 8A and 8B, the threshold value for determining the size of the display screen G is one. However, there may be a plurality of threshold values. In other words, the personal computer 50 may group the display screens G into a plurality of classes (provided one for each size) and determine the direction of displacement or the amount of displacement depending on the class into which the display screen G is grouped (however, the smaller the class into which the display screen G is grouped, the greater the amount of displacement).

Furthermore, in the embodiment described above, an example in which an indicated position $P_1$ is recognized by using the images taken by the camera 40 has been described. However, an indicated position $P_1$ may be recognized without using the images taken by the camera 40. For example, a sensor (a touch sensor, for example) may be incorporated into the screen, whereby an indicated position is recognized based on a detected signal from the screen.

In addition, although the embodiment described above deals with a case in which the cursor C is displayed in the cursor position determined by the personal computer 50 (the cursor display controlling unit), the indicating pen 20 may be provided with the function of correcting (moving) the cursor position (that is, the display position of the cursor C) determined by the personal computer 50. For example, the indicating pen 20 is allowed to accept a cursor position moving operation from the user, and control may be performed by which, when the indicating pen 20 accepts the cursor position moving operation, the personal computer 50 moves the cursor position in accordance with the cursor position moving operation and displays the cursor C in a cursor position to which the cursor position was moved.

For example, it is determined that an operation by which the scroll button 23 is rotated from the side where the bottom portion 25 is located to the side where the top portion 26 is located corresponds to a cursor position moving operation by which the cursor position is moved away from the indicated position, and an operation by which the scroll button 23 is rotated from the side where the top portion 26 is located to the side where the bottom portion 25 is located corresponds to the cursor position moving operation by which the cursor position is moved closer to the indicated position. The personal computer 50 may perform control so as to display the cursor C by moving the cursor position away from or closer to the indicated position in accordance with the direction of rotation of the scroll button 23, the direction of rotation that has been received by the radio communication unit.

Incidentally, in the indicating pen 20, the main body 21 may not have the ring portion 27. Even when the main body 21 does not have the ring portion 27, it is possible to determine the inclination of the indicating pen 20 based on the positional relationship between the position of an image-taken region of the bottom portion 25, the image-taken region which is an infrared light detected portion with a greater area detected by the camera 40 and the position of an image-taken region of the indicating section 22, the image-taken region which is an infrared light detected portion with a smaller area.

Moreover, the indicating pen 20 is pen-shaped as shown in FIG. 1. However, the indicating pen 20 may have any other shape as long as the indicating pen 20 can indicate something (for example, the indicating pen 20 may have a long rod-like shape like a conductor's baton). Furthermore, in the embodiment described above, the description has been given by using an arrow-shaped cursor C. However, cursors having other shapes can also be controlled in the same manner.

Incidentally, the processing of the cursor display controlling unit may be performed by recording a program product for executing the processing of the cursor display controlling unit according to the embodiment of the invention in a computer-readable recording medium and executing the program product recorded in the recording medium by making a computer system read the program product. It is to be noted that the "computer system" here may include hardware such as an OS and peripheral devices. Moreover, the "computer system" also includes an environment in which a homepage is offered (or displayed) when WWW is used. Furthermore, the "computer-readable recording medium" refers to a flexible disk, a magneto-optical disk, writable nonvolatile memory such as ROM and flash memory, a portable medium such as a CD-ROM, and storage such as a hard disk built into the computer system.

In addition, the "computer-readable recording medium" also includes what retains a program product for a given length of time, such as volatile memory (for example, DRAM (dynamic random access memory)) inside the computer system that is a server or a client when a program product is transmitted via a network such as the Internet or a communication link such as a telephone line. Moreover, the program product described above may be transmitted to another computer system from the computer system that stores the program product in the storage or the like via a transmission medium or by transmitted waves in the transmission medium. Here, the "transmission medium" that transmits the program product refers to a medium having the function of transmitting information, like a network (a communication net) such as the Internet or a communication link (a communication line) such as a telephone line. Furthermore, the above-described program product may be what is provided for implementing part of the functions described above. In addition, the above-described program product may be what can implement the functions described above by combination with the program product recorded in the computer system; in other words, the above-described program product may be a so-called differential file (differential program product).

While the embodiment of the invention has been described in detail with reference to the drawings, the specific configuration is not limited to this embodiment and includes any designs etc. developed without departing from the spirit of the invention.

What is claimed is:

1. A cursor display device comprising:
    an indicated position recognizing unit that recognizes an indicated position indicated by an indicating unit on a display screen projected and displayed by a projector; and
    a cursor display controlling unit that
        determines a cursor display position on the display screen offset from the indicated position by determining an amount of offset from the indicated position, and
        performs control so as to display a cursor for the indicated position at the cursor display position on the display screen,
    wherein the cursor display controlling unit determines the amount of offset from the indicated position so as to be greater, when the indicated position is located in a left-hand area or a right-hand area of the projected display screen, than the amount of offset from the indicated position when the indicated position is located in a lateral middle area of the projected display screen.

2. The cursor display device according to claim 1, wherein the indicating unit includes an operation accepting unit that accepts an operation from a user, and
    when the operation accepting unit accepts a cursor position moving operation for moving the cursor display position, the cursor display controlling unit performs control so as to move the cursor display position in accordance with the cursor position moving operation and display the cursor in a position to which the cursor display position was moved.

3. The cursor display device according to claim 1, further comprising:
an imaging unit that takes an image of the display screen and the indicated position,
wherein
the indicated position recognizing unit recognizes the indicated position based on an output of the imaging unit.

4. The cursor display device according to claim 1, wherein the cursor display controlling unit determines the amount of offset from the indicated position depending on position information of the indicating unit.

5. The cursor display device according to claim 4, wherein the position information of the indicating unit is a distance from the display screen to the projector.

6. The cursor display device according to claim 1, wherein the determining of the amount of offset from the indicated position is based at least in part on light detected by the indicated position recognizing unit.

7. The cursor display device according to claim 6, wherein the light detected by the indicated position recognizing unit is emitted by the indicating unit.

8. The cursor display device according to claim 7, wherein the light emitted by the indicating unit is emitted from at least a first light-emitting unit and a second light-emitting unit.

9. The cursor display device according to claim 1, wherein the cursor display controlling unit further determines the amount of offset from the indicated position depending on position information specifying whether the user is right-handed or left-handed.

10. The cursor display device according to claim 1, wherein
the cursor display controlling unit further determines the amount of offset from the indicated position depending on position information specifying whether the user is located on a right side or a left side of the display screen.

11. A cursor display method comprising:
recognizing an indicated position on a display screen projected and displayed by a projector;
determining a cursor display position on the display screen offset from the indicated position by determining an amount of offset from the indicated position; and
displaying a cursor for the indicated position at the cursor display position on the display screen,
wherein the amount of offset from the indicated position is determined so as to be greater, when the indicated position is located in a left-hand area or a right-hand area of the projected display screen, than the amount of offset from the indicated position when the indicated position is located in a lateral middle area of the projected display screen.

12. A cursor display method comprising:
performing calibration of a display position on a projected screen projected by a projector and an indicated position indicated by an indicating unit; and
performing cursor display such that a cursor display position for the indicated position is offset from the indicated position when a determination is made that the indicating unit is in a hovering state,
wherein the performing of the cursor display comprises determining an amount of offset from the indicated position so as to be greater, when the indicated position is located in a left-hand area or a right-hand area of the projected display screen, than the amount of offset from the indicated position when the indicated position is located in a lateral middle area of the projected display screen.

13. The cursor display method according to claim 12, wherein
when the indicating unit is in the hovering state, the amount of offset of the cursor display position is varied depending on the amount of hovering.

* * * * *